United States Patent [19]
Alfred et al.

[11] Patent Number: 5,790,348
[45] Date of Patent: Aug. 4, 1998

[54] HEAD STACK ASSEMBLY HAVING A COIL PORTION FOR DAMPING VIBRATIONS WHICH INCLUDES ELONGATED OPENINGS IN THE PLASTIC PORTION

[75] Inventors: Steven Alfred; Gordon A. Harwood; Marvin A. Schlimmer, all of Rochester, Minn.

[73] Assignee: Western Digital Corporation, Irvine, Calif.

[21] Appl. No.: 898,540

[22] Filed: Jul. 22, 1997

[51] Int. Cl.⁶ .................................................. G11B 5/55
[52] U.S. Cl. ........................................................ 360/106
[58] Field of Search ................................................ 360/106

[56] References Cited

U.S. PATENT DOCUMENTS

| | | | |
|---|---|---|---|
| 5,168,185 | 12/1992 | Umehara et al. | 310/15 |
| 5,319,512 | 6/1994 | Grapenthin | 360/106 |
| 5,453,889 | 9/1995 | Alt | 360/97 |
| 5,528,091 | 6/1996 | Loubier et al. | 310/13 |
| 5,621,590 | 4/1997 | Pace et al. | 360/106 |

*Primary Examiner*—A. J. Heinz
*Attorney, Agent, or Firm*—Leo J. Young; W. Chris Kim; Milad Shara

[57] ABSTRACT

A disk drive includes an enclosure having a base, a spindle motor fixed to the base, a disk mounted on the spindle motor, a pivot bearing cartridge, and a head stack assembly. The pivot bearing cartridge includes a shaft fixed to the enclosure, and the head stack assembly is connected to the pivot bearing cartridge for rotation relative to the shaft. The head stack assembly includes a body portion having a bore which surrounds the pivot bearing cartridge, a plurality of actuator arms with each arm cantilevered from the body portion, and a coil portion. The coil portion is cantilevered from the body portion in an opposite direction from the plurality of arms and provides damping of vibrations induced in the head stack assembly. The coil portion includes a plastic portion having a thickness, and a coil embedded in the plastic portion. The plastic portion includes a plurality of openings where each opening extends through the entire thickness of the plastic portion. Each opening is also located inside the coil and is substantially elongated in the direction in which the coil portion is cantilevered.

22 Claims, 5 Drawing Sheets

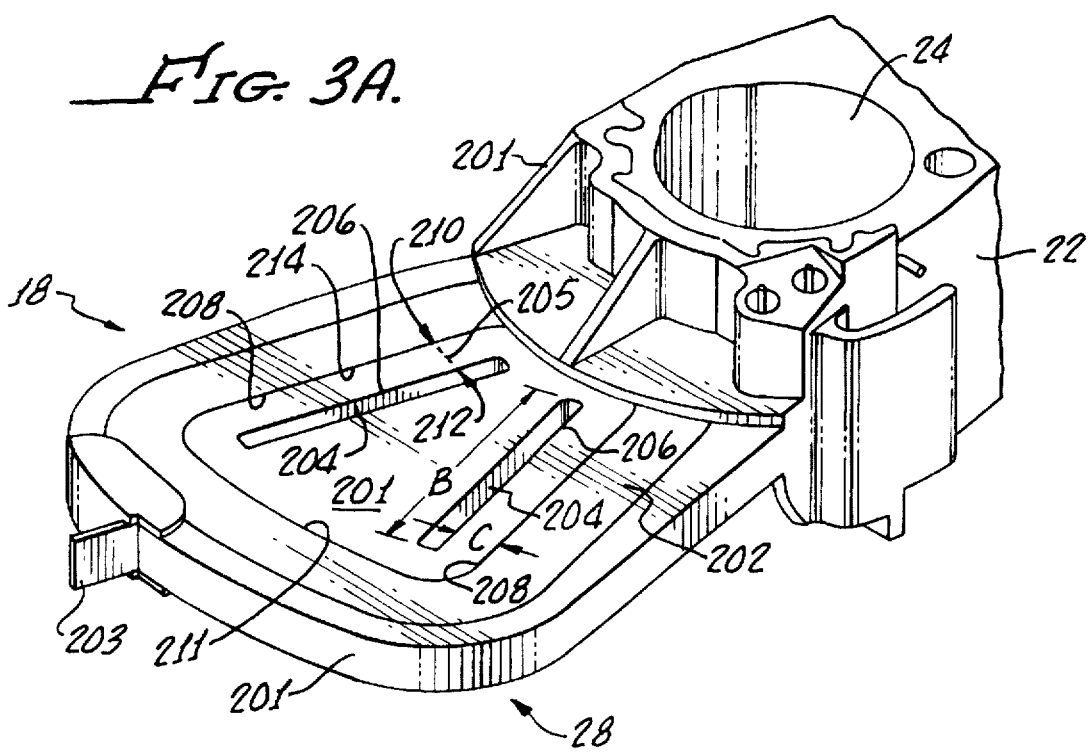
FIG. 3A.
FIG. 3B.
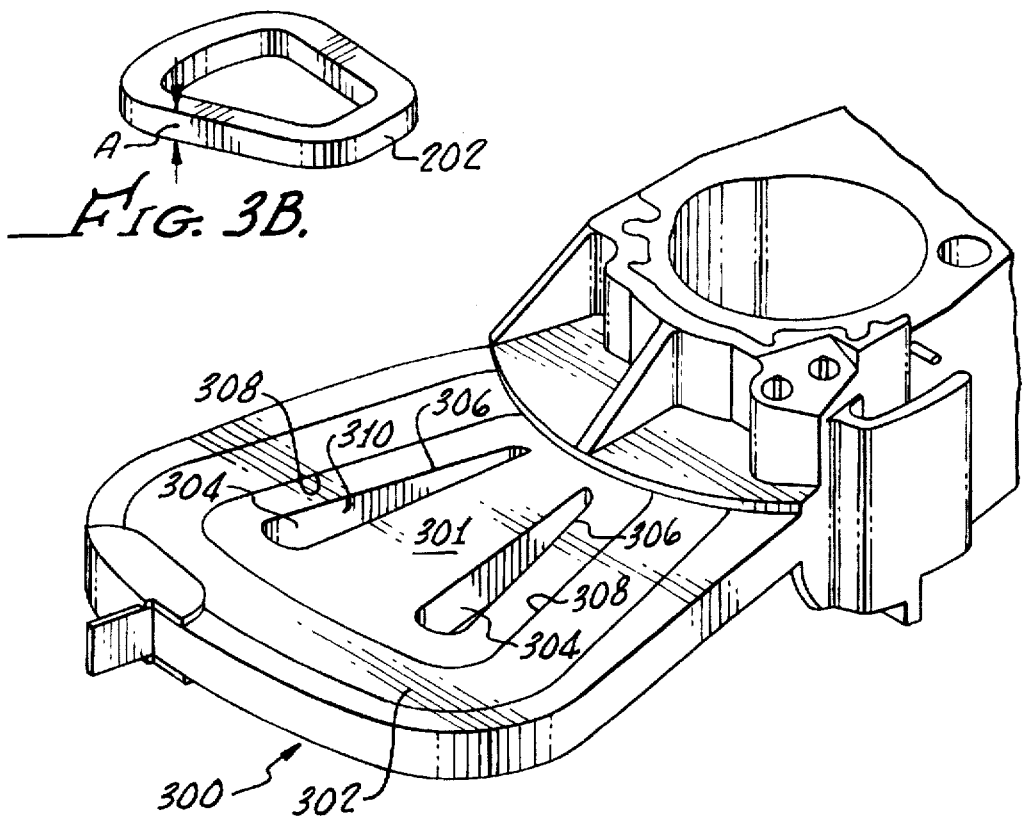
FIG. 4.

HEAD STACK ASSEMBLY HAVING A COIL PORTION FOR DAMPING VIBRATIONS WHICH INCLUDES ELONGATED OPENINGS IN THE PLASTIC PORTION

BACKGROUND OF THE INVENTION

1. Field of the Invention

This invention relates to disk drives. More particularly, this invention relates to a head stack assembly in a disk drive having a plurality of elongated openings in the coil portion.

2. Description of the Prior Art and Related Information

A huge market exists for disk drives, e.g., hard disk drives, for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main subassemblies of a hard disk drive are a head disk assembly and a printed circuit board assembly. The printed circuit board assembly includes circuitry for processing signals and controlling operations of the drive.

The head disk assembly includes an enclosure including a base and a cover, at least one disk having at least one recording surface, a spindle motor for causing each disk to rotate, and an actuator arrangement. Actuator arrangements can be characterized as either linear actuators or rotary actuators; substantially all contemporary, cost-competitive small form factor drives employ a rotary actuator.

Typically, a rotary actuator arrangement includes a permanent magnet arrangement, a head stack assembly, and a pivot bearing cartridge for rotating the head stack assembly. The head stack assembly includes a coil portion, a body portion which surrounds the pivot bearing cartridge, a plurality of actuator arms attached to the body portion, and a head gimbal assembly attached to each actuator arm. The head gimbal assembly includes a load beam or suspension, a gimbal attached to the load beam, and a transducer supported by the gimbal. The transducer is positioned over a track on a recording surface of a disk to read or write data from or on the track.

In the operation of a typical disk drive, e.g., during track seeks to a particular target track, vibrations are induced in a head stack assembly. These vibrations can include frequency components at or near resonant frequencies of the head stack assembly, resulting in relatively high amplitude vibrations. Such vibrations can degrade the performance of the disk drive.

In FIG. 1, a Prior Art head stack assembly 50, only a portion of which is shown, in a disk drive includes a coil portion 51 having a coil 54 and a plastic portion 52, an opening 56, a body portion 58, and a bore 60. Opening 56 has a shape, size, and location selected to achieve its purpose which is to balance the head stack assembly relative to a longitudinal axis of bore 60. In a seek operation, a transducer (not shown) on the head stack assembly moves across a plurality of tracks to a target track on a recording surface of a disk. After reaching the vicinity of the target track, the head stack assembly vibrates; the vibrations can include frequency components at or near resonant frequencies of the head stack assembly. The resonant frequencies of the head stack assembly typically include resonant frequencies associated with a mode known as "sway mode" resonance. Sway mode resonance may occur due to lateral or side-to-side vibrations of the coil portion of the head stack assembly relative to its body portion.

In Prior Art FIG. 5A, a curve 500 represents a transmission characteristic of prior art head stack assembly 50, a portion of which is shown in Prior Art FIG. 1. As seen on curve 500, at certain resonant frequencies, e.g., 4.8 kHz, the amplitude of the vibrations tend to peak, such as at 502. Such amplitude peaks disadvantageously affect the operation of the disk drive by increasing the settling time of the transducer on the target track. Moreover, these peaks may have sufficient amplitude to generate a problem known as write unsafe (WUS). Such a write unsafe condition can result in a need for the disk drive to wait, typically, one revolution of the disk, until the transducer settles on track before beginning a write operation. This wait time degrades the performance of the disk drive.

In Prior Art FIG. 6A, curve 600 represents the motion of the transducer of the head stack assembly as a function of time in settling into a target track, where the curve has been determined by averaging the data observed in 50 track seeks. As evident by curve 600, the transducer oscillates around the centerline of the target track which is represented by the "0" value on the vertical axis. The oscillation occurs over an extended time period. The disk drive must wait until the transducer settles on the target track before beginning an operation, e.g., a write operation.

In efforts to deal with such problems in the past, constrained layer dampers were used, typically in load beams of head stack assemblies, to overcome resonance problems associated with the head stack assemblies. However, such dampers are generally ineffective in damping vibrations which are attributed to sway mode resonance. Also, such dampers are often expensive, difficult to apply, and increase the inertia of the head stack assembly.

SUMMARY OF THE INVENTION

This invention can be regarded as a head stack assembly for a disk drive which includes a body portion, a plurality of actuator arms, and a coil portion. The body portion has a bore which defines an axis of rotation for the head stack assembly. Each arm is cantilevered from the body portion, and the coil portion is cantilevered from the body portion in an opposite direction from the plurality of arms. The coil portion provides damping of vibrations induced in the head stack assembly. The coil portion includes a plastic portion having a thickness and a coil embedded in the plastic portion. The plastic portion includes a plurality of openings. Each opening extends through the entire thickness of the plastic portion, is located inside the coil, and is substantially elongated in the direction in which the coil portion is cantilevered.

This invention can also be regarded as a disk drive which includes an enclosure having a base, a spindle motor, a disk, a pivot bearing cartridge, and a head stack assembly. The spindle motor is fixed to the base, and the disk is mounted on the spindle motor. The pivot bearing cartridge includes a shaft which is fixed to the enclosure. The head stack assembly is connected to the pivot bearing cartridge for rotation relative to the shaft. The head stack assembly includes a body portion, a plurality of actuator arms, and a coil portion. The body portion has a bore which surrounds the pivot bearing cartridge. Each arm is cantilevered from the body portion, and the coil portion is cantilevered from the body portion in an opposite direction from the plurality of arms. The coil portion provides damping of vibrations induced in the head stack assembly and includes a plastic portion having a thickness and a coil embedded in the plastic portion. The plastic portion includes a plurality of openings. Each opening extends through the entire thickness of the plastic portion, is located inside the coil, and is substantially elongated in the direction in which the coil portion is cantilevered.

BRIEF DESCRIPTION OF THE DRAWINGS

FIG. 3A is a perspective view of a portion of a head stack assembly shown in FIG. 2;

FIG. 3B is a perspective view of a coil shown in FIG. 3A;

FIG. 4 is a perspective view of a portion of a head stack assembly in accordance with another embodiment of this invention;

DETAILED DESCRIPTION OF THE PREFERRED EMBODIMENTS

Figure 2:
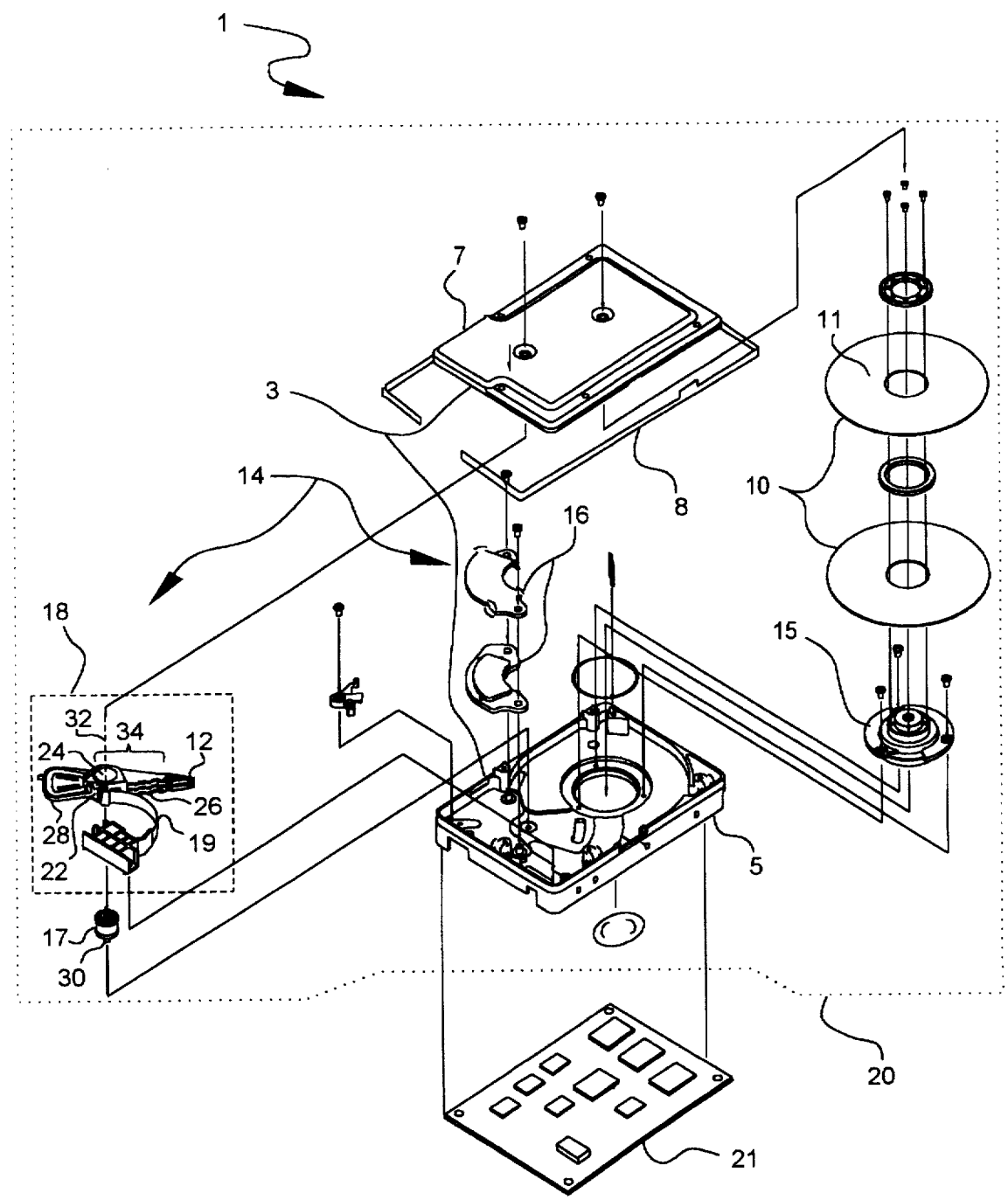
FIG. 2 is an exploded view of a hard disk drive incorporating an embodiment of this invention.

In FIG. 2, a disk drive 1, such as a hard disk drive, which incorporates an embodiment of this invention includes a head disk assembly 20 and a printed circuit board assembly 21. Printed circuit board assembly 21 includes circuitry for processing signals and controlling operations of disk drive 1. Head disk assembly 20 includes an enclosure 3 comprising a base 5 and a cover 7. Enclosure 3 is sealed to provide a relatively contaminant-free interior for head disk assembly 20 of disk drive 1. Suitably, a tape seal 8 is used to seal enclosure 3.

Figure 1:
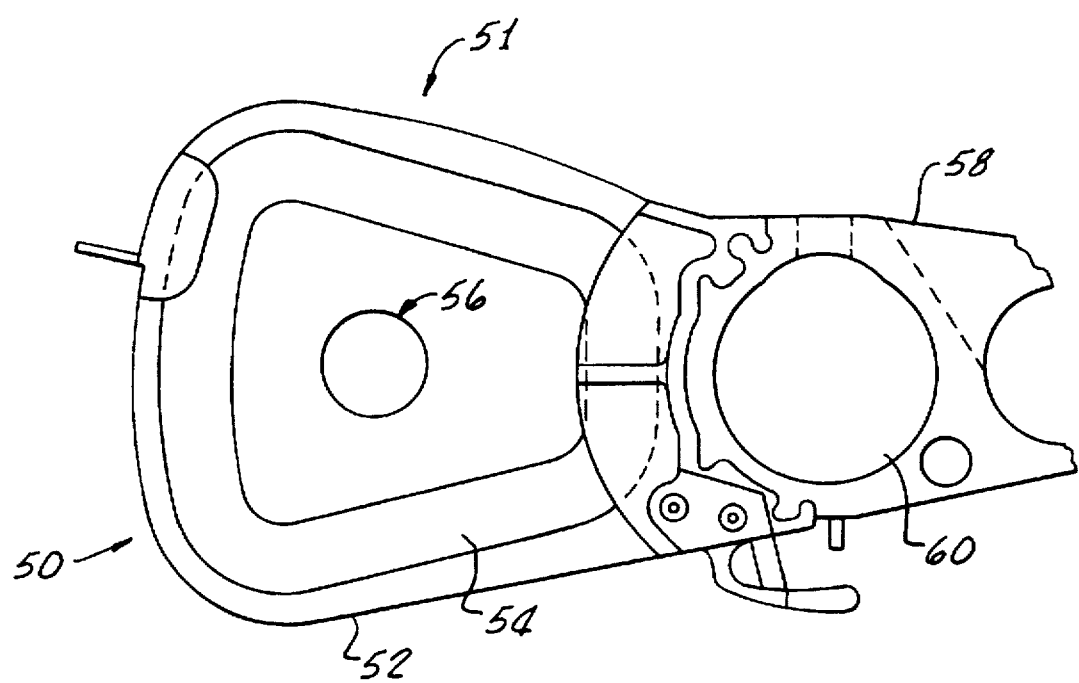
FIG. 1 is a plan view of a portion of a prior art head stack assembly.

Within its interior, head disk assembly 20 includes a magnetic disk 10 having a recording surface 11, and includes a magnetic transducer 12. The particular embodiment shown in FIG. 1 includes two disks 10 mounted on a spindle motor 15, providing four recording surfaces, and includes four magnetic transducers 12. Disk drive 1 further includes a rotary actuator arrangement generally indicated at 14. Spindle motor 15, fixed to base 5, causes each disk 10 to spin, preferably at a constant angular velocity.

Rotary actuator arrangement 14 provides for positioning magnetic transducer 12 over a selected area of recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft 30 which is fixed to enclosure 3. Head stack assembly 18 includes a flex circuit assembly 19, a body portion 22, a plurality of actuator arms 26, and a coil portion 28. Each actuator arm is cantilevered from body portion 22 and is made from materials such as metal or plastic. Typically, actuator arms 26 form part of what is known as an E-block assembly, such as an E-block assembly 34; E-block assembly 34 includes body portion 22 and actuator arms 26. Alternatively, actuator arms 26 can be formed by stacking each arm as disclosed in a co-pending U.S. patent application, Ser. No. 08/672,146 which is incorporated by reference herein. Head stack assembly 18 also includes a bore 24 which defines an axis of rotation 32 for head stack assembly 18. Bore 24 surrounds pivot bearing cartridge 17 such that head stack assembly is connected to pivot bearing cartridge 17 for rotation relative to shaft 30.

In FIG. 3A, head stack assembly 18 of FIG. 2, only a portion of which is shown, includes coil portion 28, body portion 22, bore 24, and a tang 203. Coil portion 28 is cantilevered from body portion 22 in a direction opposite from actuator arms 26 and provides damping of vibrations induced in head stack assembly 18. Coil portion 28 includes a plastic portion 201 having a predetermined thickness, and a coil 202 embedded in plastic portion 201. Suitably, coil 202 is made from a metal such as copper. Plastic portion 201 can be made from any suitable plastic; preferably, polyphenylene sulfide is used. Also, plastic portion 201 is glass filled at a percentage which typically ranges from 39–41 percent; preferably, plastic portion 201 is 40 percent glass filled. Coil 202 has a height A as shown in FIG. 3B.

Plastic portion 201 includes a plurality of substantially elongated openings 204 where in this embodiment, each opening is in the shape of a rectangular parallelepiped and extends through the entire thickness of plastic portion 201. Moreover, in this embodiment two openings 204 are located inside coil 202, and each opening extends in the direction in which coil portion 28 is cantilevered. Each opening has an outer side 206 extending along its length B which is substantially parallel to an oppositely facing side 208 of an inner perimeter 211 of coil 202. Length B can be any suitable length; preferably, length B is greater than or equal to 1.5×A, where A equals the height of coil 202 as shown in FIG. 3B. For example, if height A of coil 202 equals approximately 0.086 inches, then length B is greater than or equal to approximately 0.129 inches. Preferably, outer side 206 is parallel to side 208 such that outer side 206 is at a distance C from side 208.

As shown in FIG. 3A, when each opening is in the shape of a rectangular parallelepiped, distance C is substantially constant throughout the entire length of each opening. However, distance C may vary along the entire length of each opening; preferably, distance C is in the range of 0.5A to 2A where distance C is defined as a distance between a nearest point of side 208 of inner perimeter 211 of coil 202 and each respective point on outer side 206 of each opening.

For example, as shown in FIG. 3A, distance C would be the distance between the endpoints of a dashed line 205 which is perpendicular to outer side 206 and side 208 of each opening. Hence, in this example, the nearest point of side 208 would be the point indicated by line 210, and the respective point on outer side 206 would be the point indicated by line 212. Furthermore, if A equals approximately 0.086 inches, then distance C is in the range of 0.5A to 2A or approximately 0.043 to 0.172 inches.

In FIG. 4, a head stack assembly 300, only a portion of which is shown, is substantially the same as the embodiment shown in FIG. 3A. Here, openings 304 are shaped differently. It includes two substantially elongated openings 304 which are in the shape of a teardrop. Since openings 304 are three dimensional, each opening has a surface, such as surface 310, which extends along the entire thickness of a plastic portion 301. An outer side 306 of each opening is substantially parallel with an oppositely facing side 308 of the inner perimeter of a coil 302.

The various embodiments of this invention, such as the embodiments shown in FIGS. 3A and 4, are made, for example, by placing into a suitable mold a tang, such as tang 203, a coil, such as coil 202, and an E-block assembly, such as E-block assembly 34. Then, plastic is injected into the mold to form a plastic portion having the openings, such as plastic portion 201. Alternatively, the openings, such as openings 204, can be formed by machining them in after the plastic portion has been formed by the injection molding or overmolding process.

In operation, the embodiments of this invention, such as the embodiments shown in FIGS. 3A and 4, provide significant damping of vibrations induced in the head stack assembly at resonant frequencies during, e.g. track seek operations. For example, when vibrations occur at the end of a track seek, the presence of the openings, such as openings 204 shown in FIG. 3A, allows microslippage to occur at an interface, e.g., interface 214, between the plastic portion and the coil, such as plastic portion 201 and coil 202. This microslippage or motion absorbs the energy of the vibrations such that damping of the vibrations occurs.

Figure 5A:
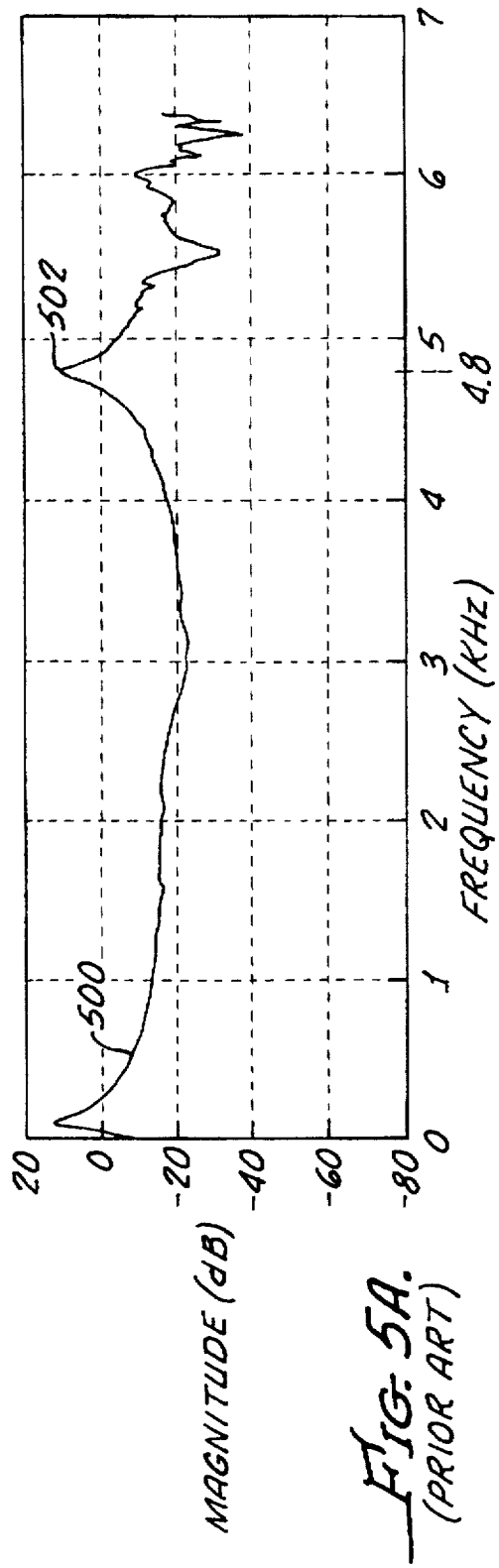
FIG. 5A is a graph which shows the effects of resonance of the prior art head stack assembly of FIG. 1.
Figure 5B:
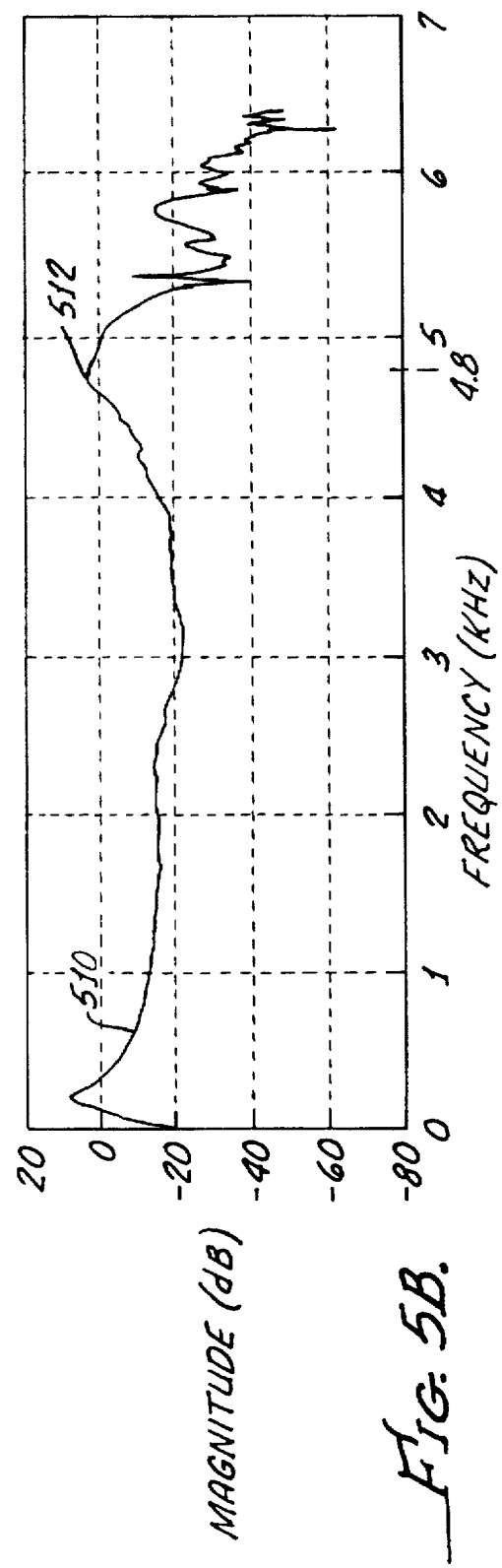
FIG. 5B is a graph which shows the damping of vibrations at resonance frequencies in accordance with this invention as shown, for example, in FIGS. 3A and 4.
Figure 6A:
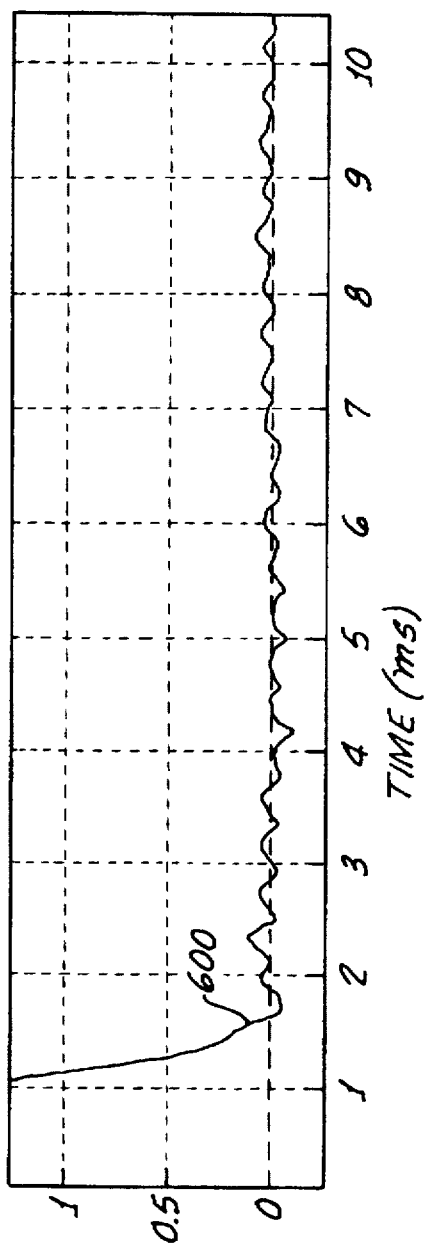
FIG. 6A is a graph of the average settling time of a transducer of the Prior Art head stack assembly of FIG. 1.
Figure 6B:
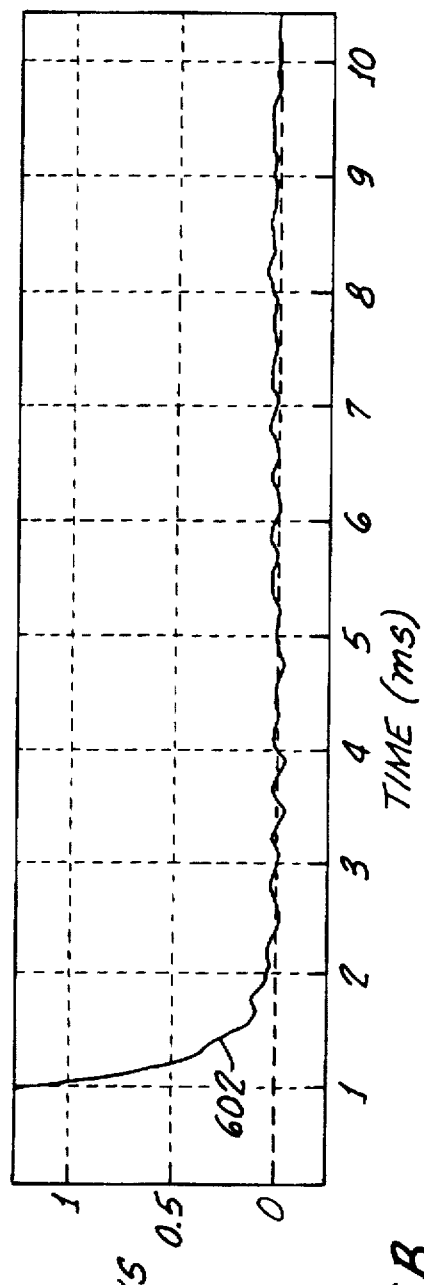
FIG. 6B is a graph of the average settling time of a transducer of the head stack assembly of this invention as shown, for example, in FIGS. 3A and 4.

The advantages of this invention are shown in FIGS. 5B and 6B. In FIG. 5B, a curve 510 represents a transmission characteristic of the head stack assembly of this invention, such as the embodiments shown in FIGS. 3A and 4. Significantly, the damping which this invention provides, is evident by comparing curve 510 with curve 500 of Prior Art FIG. 5A. At a particular resonant frequency, e.g., 4.8 kHz, the amplitude of the vibration at 512 (FIG. 5B) was reduced by approximately 6–8 dB compared to the amplitude of the vibration at 502 in Prior Art FIG. 5A.

In FIG. 6B, curve 602 represents the motion of the transducer of the head stack assembly of this invention as a function of time in settling into a target track, where the curve has been determined by averaging the data observed in 50 track seeks as in Prior Art FIG. 6A. Significantly, the average settling time gained from this invention is lower than the Prior Art average settling time as seen from a comparison of curve 602 (FIG. 6B) with curve 600 (FIG. 6A).

As shown in FIGS. 5B and 6B, this invention advantageously damps the vibrations induced in the head stack assembly at resonant frequencies; in particular, it damps vibrations which are attributed to sway mode resonance. Significantly, the damping of the vibrations decreases the settling time of a transducer during a track seek operation and leads to a fewer number of write unsafe conditions issued by a disk drive.

We claim:

1. A head stack assembly for a disk drive comprising:
   a body portion having a bore, the bore defining an axis of rotation for the head stack assembly;
   a plurality of actuator arms, each arm cantilevered from the body portion;
   a coil portion cantilevered from the body portion in an opposite direction from the plurality of arms and providing damping of vibrations induced in the head stack assembly;
   the coil portion comprising:
      a plastic portion having a thickness;
      a coil embedded in the plastic portion;
      the plastic portion including a plurality of openings, each opening extending through the entire thickness of the plastic portion, being located inside the coil, and being substantially elongated in the direction in which the coil portion is cantilevered.

2. The head stack assembly of claim 1 wherein the plastic portion includes two openings and each opening is in the shape of a rectangular parallelepiped.

3. The head stack assembly of claim 2 wherein each rectangular parallelepiped extends substantially parallel to a respective portion of the coil.

4. The head stack assembly of claim 3 wherein each rectangular parallelepiped extends parallel to the respective portion of the coil.

5. The head stack assembly of claim 1 wherein each opening has an outer side in the length direction which is substantially parallel to a respective portion of the coil.

6. The head stack assembly of claim 5 wherein the outer side in the length direction is parallel to the respective portion of the coil.

7. The head stack assembly of claim 1 wherein the plastic portion includes polyphenylene sulfide.

8. The head stack assembly of claim 1 wherein the coil has a height A and each opening has a length B wherein the length B is greater than or equal to 1.5×A.

9. The head stack assembly of claim 8 wherein a distance C is in the range of 0.5A to 2A, the distance C spanning the entire length B of each opening and defined as a distance between a nearest point of a respective portion of an inner perimeter of the coil and each respective point on an outer side of the length B of each opening.

10. The head stack assembly of claim 9 wherein each opening is in the shape of a rectangular parallelepiped.

11. The head stack assembly of claim 1 wherein the plastic portion includes two openings and each opening is in the shape of a teardrop, each teardrop shaped opening having a respective surface extending along the entire thickness of the plastic portion.

12. A disk drive comprising:
   an enclosure having a base;
   a spindle motor fixed to the base;
   a disk mounted on the spindle motor;
   a pivot bearing cartridge including a shaft fixed to the enclosure;
   a head stack assembly connected to the pivot bearing cartridge for rotation relative to the shaft;
   the head stack assembly comprising:
      a body portion having a bore, the bore surrounding the pivot bearing cartridge;
      a plurality of actuator arms, each arm cantilevered from the body portion;
      a coil portion cantilevered from the body portion in an opposite direction from the plurality of arms and providing damping of vibrations induced in the head stack assembly;

the coil portion comprising:

a plastic portion having a thickness;

a coil embedded in the plastic portion;

the plastic portion including a plurality of openings, each opening extending through the entire thickness of the plastic portion, being located inside the coil, and being substantially elongated in the direction in which the coil portion is cantilevered.

13. The disk drive of claim 12 wherein the plastic portion includes two openings and each opening is in the shape of a rectangular parallelepiped.

14. The disk drive of claim 13 wherein each rectangular parallelepiped extends substantially parallel to a respective portion of the coil.

15. The disk drive of claim 14 wherein each rectangular parallelepiped extends parallel to the respective portion of the coil.

16. The disk drive of claim 12 wherein each opening has an outer side in the length direction which is substantially parallel to a respective portion of the coil.

17. The disk drive of claim 16 wherein the outer side in the length direction is parallel to the respective portion of the coil.

18. The disk drive of claim 12 wherein the plastic portion includes polyphenylene sulfide.

19. The disk drive of claim 12 wherein the coil has a height A and each opening has a length B wherein the length B is greater than or equal to 1.5×A.

20. The disk drive of claim 19 wherein a distance C is in the range of 0.5A to 2A, the distance C spanning the entire length B of each opening and defined as a distance between a nearest point of a respective portion of an inner perimeter of the coil and each respective point on an outer side of the length B of each opening.

21. The disk drive of claim 20 wherein each opening is in the shape of a rectangular parallelepiped.

22. The disk drive of claim 12 wherein the plastic portion includes two openings and each opening is in the shape of a teardrop, each teardrop shaped opening having a respective surface extending along the entire thickness of the plastic portion.

* * * * *